(12) United States Patent
Gurusami et al.

(10) Patent No.: US 9,494,484 B2
(45) Date of Patent: Nov. 15, 2016

(54) IN-SERVICE OPTICAL TIME DOMAIN REFLECTOMETRY UTILIZING RAMAN PUMP SOURCE

(71) Applicant: II-VI Incorporated, Saxonburg, PA (US)

(72) Inventors: Aravanan Gurusami, Morgan Hill, CA (US); Timothy K. Zahnley, Savona, NY (US); Scott Dahl, Lindley, NY (US); Martin R. Williams, Big Flats, NY (US); Ian P. McClean, Brixham (GB)

(73) Assignee: II-VI INCORPORATED, Saxonburg, PA (US)

( * ) Notice: Subject to any disclaimer, the term of this patent is extended or adjusted under 35 U.S.C. 154(b) by 81 days.

(21) Appl. No.: 14/630,988

(22) Filed: Feb. 25, 2015

(65) Prior Publication Data

US 2015/0253217 A1 Sep. 10, 2015

Related U.S. Application Data (60) Provisional application No. 61/950,116, filed on Mar. 9, 2014.

(51) Int. Cl.
*G01N 21/00* (2006.01)
*G01M 11/00* (2006.01)
*H01S 3/30* (2006.01)

(52) U.S. Cl.
CPC ....... *G01M 11/3127* (2013.01); *G01M 11/319* (2013.01); *H01S 3/302* (2013.01)

(58) Field of Classification Search
CPC ......... G01M 11/3145; G01M 11/335; G01M 11/33; G01M 11/3109; G01M 11/338

USPC ....................................................... 356/73.1
See application file for complete search history.

(56) References Cited

U.S. PATENT DOCUMENTS

| 5,867,305 | A | * | 2/1999 | Waarts | H01S 3/06754 359/337.12 |
| 5,930,030 | A | * | 7/1999 | Scifres | H01S 3/06754 359/341.3 |
| 6,081,369 | A | * | 6/2000 | Waarts | H01S 3/06754 359/341.33 |
| 6,633,599 | B2 | | 10/2003 | Murray et al. | |
| 6,643,059 | B1 | | 11/2003 | Grant et al. | |
| 6,850,360 | B1 | | 2/2005 | Chen et al. | |
| 7,852,550 | B2 | | 12/2010 | Okaniwa et al. | |

(Continued)

OTHER PUBLICATIONS

Zhou et al., "A New Frequency Model for Pump-to-Signal RIN Transfer in Brillouin Fiber Amplifiers", IEEE Photonics Technology Letters, vol. 19, No. 13, pp. 978-980, Jul. 1, 2007.

(Continued)

*Primary Examiner* — Tarifur Chowdhury
*Assistant Examiner* — MD M Rahman
(74) *Attorney, Agent, or Firm* — Wendy W. Koba (57) ABSTRACT

An arrangement for providing real-time, in-service OTDR measurements in an optical communication system utilizing distributed Raman amplification. One or more of the laser diodes used to provide the pump light necessary to create optical gain is modified to also generate short duration pulses that ride above or below the conventional pump light. These short duration pulses (which co-exist with the pump light within the optical fiber) are used in performing OTDR measurements, with a conventional processing system used to evaluate reflected pulses and create the actual OTDR measurements.

20 Claims, 5 Drawing Sheets

(56) References Cited

U.S. PATENT DOCUMENTS

| | | |
|---|---|---|
| 8,520,196 B2 | 8/2013 | Hirai et al. |
| 2003/0091267 A1 | 5/2003 | Alvarez et al. |
| 2005/0024716 A1* | 2/2005 | Nilsson ............ H01S 3/094003 359/341.31 |
| 2007/0177254 A1 | 8/2007 | Ghera et al. |
| 2011/0026104 A1 | 2/2011 | Hiraizumi |
| 2014/0055777 A1 | 2/2014 | Archambault et al. |

OTHER PUBLICATIONS

Sang et al., "Pump to Signal RIN Transfer in Silicon Raman Amplifiers", 2009 OSA/OFC/NFEC.

Wuilpart, et al., "Dynamics Enhancement of OTDR-based Monitoring Systems for Passive Optical Networks", Proceedings Symposium IEEE/LEOS Benelux Chapter, 2007, Brussels.

* cited by examiner

IN-SERVICE OPTICAL TIME DOMAIN REFLECTOMETRY UTILIZING RAMAN PUMP SOURCE

CROSS-REFERENCE TO RELATED APPLICATIONS

This application claims the benefit of U.S. Provisional Application No. 61/950,116, filed Mar. 9, 2014 and herein incorporated by reference.

TECHNICAL FIELD

The present invention relates to performing optical time domain reflectometry (OTDR) measurements and, more particularly, to a configuration for performing on-going OTDR measurements for in-service optical transmission systems utilizing distributed Raman amplification.

BACKGROUND OF THE INVENTION

The ever-increasing demand for optical bandwidth continues to drive the need for faster data transmission rates, which then requires improvements in system performance for parameters such as optical signal to noise ratio (OSNR). While some attempts in improving OSNR involve changes in the coding schemes utilized to perform the data transmission, other attempts are directed to improving the optical properties of the transmission channel itself. For example, amplification of the optical signal along a transmission span using the technique of distributed Raman amplification (DRA) is becoming prevalent in a variety of different optical communication systems.

While useful, DRA requires the use of relatively high power pump sources to initiate the generation of gain within the transmission medium (e.g., power levels higher than 500 mw are routinely required). The presence of high power light has safety implications, both for the personnel installing the DRA in the optical communication system as well as for the actual waveguide (e.g. fiber) transporting the signal. For example, before provisioning a DRA, it is important to know if there are any "breaks" or other types of flaws along the associated fiber span where the amplification is to take place. This is especially a concern in the central office (CO) environment, where high Raman pump powers could emit unsafe levels of optical power and expose various pieces of equipment to damage (as well as personnel to injury at the CO location). These concerns, among others, have prompted the search for a way to deploy DRAs in a manner that is as safe as possible.

Moreover, the ability to determine the fiber characteristics, such as attenuation or Raman gain coefficient, are important as part of the analysis involved in optimizing the parameters required to achieve the best performance from a DRA system that is being installed along a span of optical fiber. Adding intelligence into optical components, such as embedding an optical time domain reflectometry (OTDR) measurement capability, is important in determining key system factors associated with achieving as much signal amplification as possible.

In conventional situations, OTDR measurements are made upon the installation of a new DRA system (before sending "live" traffic over the fiber) so that the personnel performing the installation will have an understanding of the quality of the span. The data collected by the OTDR measurement may then be used, for example, to ensure that the fiber is of the high quality necessary to support the utilization of high power Raman pumps. Various other characteristics of the fiber can be measured and used to assess the amount of amplification that may be achieved.

In operation of an exemplary OTDR measurement system, a pulse of light is injected into a section of optical fiber and the reflections coming back towards the pulse source are captured and measured over a period of time. The reflections can be used to determine what losses exist along the fiber, such as those associated with Fresnel reflections (at interruptions such as connectors, splices, or the like) or Rayleigh backscatter (which is the reflection derived from the nature of the fiber/waveguide structure itself).

Inasmuch as it is relatively expensive and time-consuming to deploy an engineer to perform the OTDR measurements at the location of a new installation, there has been an on-going effort to develop various types of remote testing. While advances have been made that utilize a Raman pump source itself to create the pulses used for OTDR measurements, this type of testing can only be performed when the system is otherwise not in service (i.e., when the Raman pump sources are not being used as create gain in propagating transmission signals). While this condition is met for the situation of testing new installations, there remains a need to perform on-going OTDR measurements for maintenance reasons, such as monitoring the health of the fiber and determining if there is a degradation in performance over the operational lifetime of the system. For this collection of long-term data, it is not feasible to periodically take a portion of a system out of service, perform an OTDR measurement, and then bring the system back on line, as would be required if the conventional method of using Raman pumps was employed.

SUMMARY OF THE INVENTION

The needs remaining in the prior art are addressed by the present invention, which relates to performing optical time domain reflectometry (OTDR) measurements and, more particularly, to a configuration for performing on-going OTDR measurements for optical transmission systems utilizing distributed Raman amplification (DRA) within the deployed arrangement.

In accordance with the present invention, a DRA system is modified so that it is used to perform in-service (i.e., "live") OTDR measurements while continuing to perform its primary function of amplifying the propagating optical data signal. In particular, at least one of the pump sources within a DRA system is configured to emit relatively short pulses that ride above or below the DC level of the conventional Raman amplification pump signal. The OTDR pulses are preferably separated in time by a relatively long span such that a communication signal propagating along the fiber span would only encounter a single pulse as it passes through the entire span, the "separation in time" also referred to at times as the "repetition interval" of the OTDR pulses. The pulses are selected to be of a magnitude sufficient to perform the "probing" necessary the desired OTDR measurements, without unduly disrupting the primary goal of creating optical gain for the propagating optical data signal. The reflected pulses are removed from the signal path and evaluated in a manner similar to conventional OTDR systems.

In one embodiment, additional optical filtering is utilized on the return pulse path to remove unwanted reflected pump light prior to introducing the reflected OTDR pulses to the OTDR measuring system.

An exemplary configuration of the present invention may generate OTDR pulses on more than one Raman pump source, where the pulses from different sources may be used in sequence, or are configured of different durations or amplitudes. Indeed, a configuration of the present invention may include a pulse controller that dictates the specifics of the pulse parameters for the one or more Raman pump sources used to supply OTDR pulses. Further, it is contemplated that the results of the OTDR measurements may be used as a feedback signal to control the various parameters associated with pulse generation for the ODTR measurement system.

One exemplary embodiment of the present invention comprises an arrangement for performing optical time reflectometry (OTDR) within a communication system utilizing distributed Raman amplification provided by a Raman pump source that supplies continuous power pump light to generate optical gain for a propagating signal. The arrangement includes a pulse generator coupled to the Raman pump source for injecting pulses of a predetermined polarity, duration, modulation depth and repetition interval upon the supplied pump light such that the pulses propagate along with the continuous power pump light along a span of optical waveguide (e.g., fiber) to perform OTDR measurements while continuing to generate optical gain. The injected pulses propagate along the optical waveguide and create a plurality of reflected pulses as a function of conditions along the optical waveguide. A monitoring module is included and is responsive to the plurality of reflected pulses and includes the conventional components required for determining OTDR measurements from the reflected optical pulses.

Other and further aspects and features of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

An arrangement for providing "in-service" (i.e., "live") OTDR measurements is proposed in accordance with the present invention that is able to utilize a Raman pump source to provide OTDR pulses while it continues to operate in its primary role as creating gain in the propagating optical transmission signal. In accordance with the teachings of the present invention, a Raman pump source is momentarily pulsed to either a higher or lower level than that nominally used for the amplifying process. The OTDR pulse is configured to have a relatively short duration on the order of, for example, tens to hundreds of nanoseconds, and will travel along the fiber span and be reflected in the manner well-understood for the purposes of OTDR measurements.

As will be explained in detail below, the pulses are preferably timed to have an extremely long repetition interval so that an optical transmission signal propagating along the fiber being measured would only encounter a single OTDR pulse as it transits along the fiber span being measured. For example, if the pulse width is selected to be about 200ns, then the spatial extent of the pulse will span a distance of about 40m along the optical fiber being measured. In configurations where the pulse is traveling in a direction counter to the signal, the length of fiber that any given signal and pulse would share would be about half of this spatial extent of the pulse (i.e., on the order of 20m in this example). In most conventional installations, the span of fiber that is being monitored has a length on the order of 20 km. Given these values, the perturbation from the pulse will only affect about 0.1% of the total length of the fiber span. Even if the pulse was selected to be strong enough to instantaneously double the Raman gain coefficient, the maximum impact would be on the order of 0.02dB.

Figure 1:
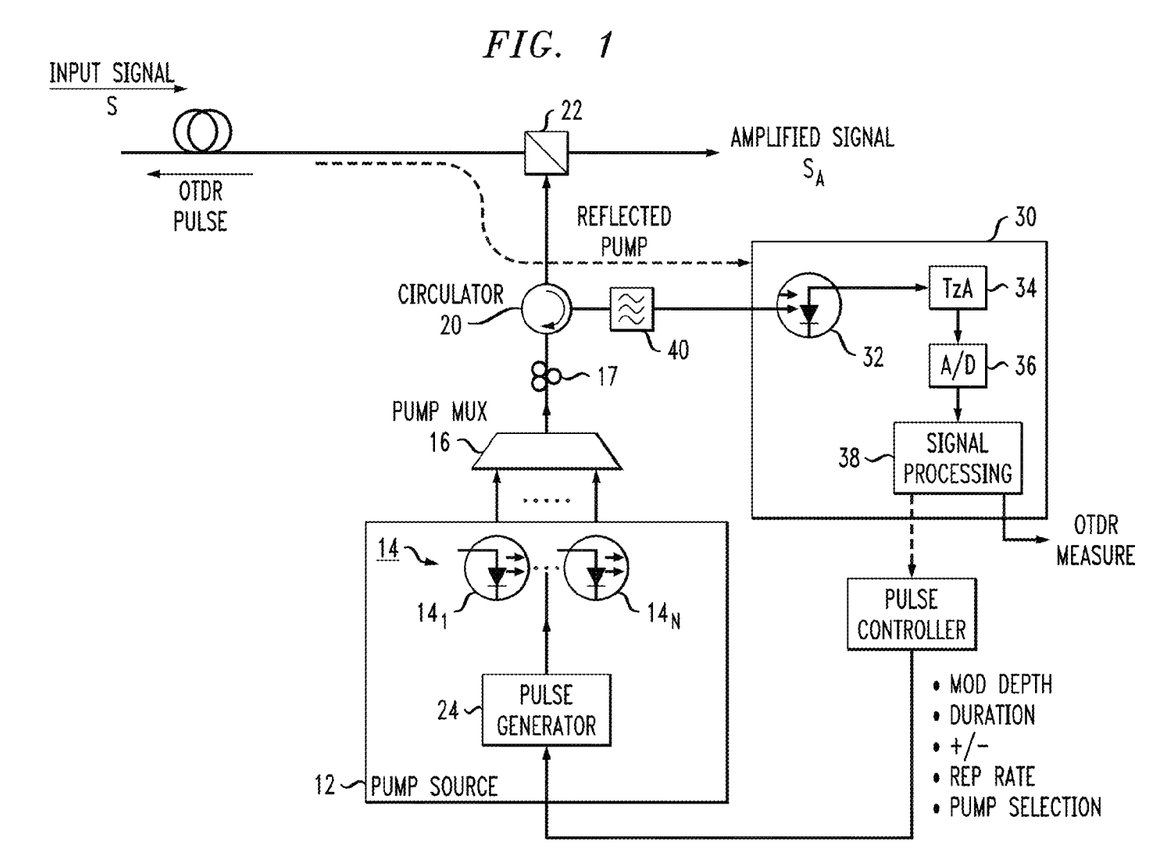
FIG. 1 is a diagram of an exemplary arrangement for performing in-service OTDR measurements utilizing a conventional distributed Raman amplifier (DRA) system.

An exemplary embodiment of an inventive arrangement for performing in-service OTDR measurements using an existing distributed Raman amplifier (DRA) system is shown in FIG. 1. In this case, it is desired to perform in-service monitoring of a span of optical fiber 10 being used to support the transmission of one or more optical input signals S, propagating in the direction indicated by the arrow in FIG. 1. As will be explained in detail below, a Raman pump source 12 is modified in accordance with the principles of the present invention so that it may be used to inject OTDR pulses along fiber span 10, while also providing the pump light required for producing Raman gain in the signal band through stimulated Raman scattering (SRS).

Prior to describing the details of the OTDR measurement features of the present invention, the operation of a DRA system will be briefly reviewed. As is well known in the art, Raman amplification of a propagating optical data signal is provided by injecting light at a known "pump" wavelength into the fiber (or other type of waveguide) supporting the propagation of the data signal. The presence of this pump light in the fiber with the optical data signal creates stimulated Raman scattering (SRS), which compensates for a portion of the loss that has been experienced by the propagating optical input signal S as it progresses along the transmission fiber. In situations where multiple data signals are being transmitted, each at a different wavelength, a multiple set of pump sources may be used, each creating pump light at a wavelength suitable for providing amplification at one or more of data signal wavelengths. As mentioned above, the phenomena of SRS becomes problematic in the presence of relatively high power pump levels (greater than about 500 mw) or so.

With reference to FIG. 1, a Raman pump source 12 is shown as including a number of separate Raman pumps $14_1$-$14_N$, each typically operating to generate pump light at a different wavelength (for the reasons mentioned above), although it is possible to utilize multiple sources operating at the same pump wavelength in order to increase the power created at a specific wavelength. In general, each Raman pump wavelength is about a Stokes shift in wavelength below a wavelength band associated with a given optical input signal. The individual outputs from the set of pumps 14 are passed through a combiner 16 (such as a wavelength division multiplexer) so that they are all propagating along a common pump path 18. A depolarizer 17 is be disposed along pump path 18 and used to remove polarization-dependent pump components, improving the uniformity of the Raman amplification that will be introduced into the optical data signals propagating along optical fiber 10.

The combined Raman pumps pass through an optical circulator 20 (or other suitable type of tap or coupler) and are thereafter directed by a wavelength division multiplexer/demultiplexer (WDM) 22 into optical fiber 10. In this particular configuration, the pump light will propagate in a direction counter to the signal flow (as indicated by the arrows in FIG. 1). The presence of the Raman pump light creates gain in the transmission signal in a manner well known in the art. As will be discussed below, the use of a counter-propagating configuration is preferable for the OTDR measurement functionality associated with the present invention, since the overlap between the optical data signals and the OTDR probe pulses is minimized for this arrangement.

With this understanding of the Raman amplification process, the particulars of the present invention will now be described in detail.

Indeed, in accordance with the present invention, pump source 12 is configured to include a configuration for introducing pulses onto the pump light being utilized for amplification purposes. Referring to FIG. 1, pump source 12 is formed to include a pulse generator 24 that is used to inject narrow, spaced-apart pulses onto one or more of the Raman pumps $14_1$-$14_N$. As described above, the pulses themselves are inserted at the DC level of the Raman pump used to provide gain within the fiber span, and may either be inserted as a pulse that goes above the DC level, or a pulse that goes below the DC level. The pulses "piggy back" on the pump light, and are injected to propagate along the fiber span that is being illuminated by the pump light for amplification purposes. This use of pulses that ride on the DC level of the pump light is in contrast to prior art arrangements that utilized a Raman pump source to perform OTDR measurements, but required that the pump light be turned "off", and then pulses created, separate from the pump, to perform OTDR measurements.

In accordance with the present invention, the OTDR pulses are preferably configured to be relatively narrow (on the order of tens to hundreds of ns) with a modulation depth on the order of 250 mA or so (with a 750 mA DC level pump light). A long repetition interval for the pulses is preferred, so that a propagating data signal will encounter very few pulses (preferably, only a single pulse) as it propagates along the fiber being measured.

Figure 2:
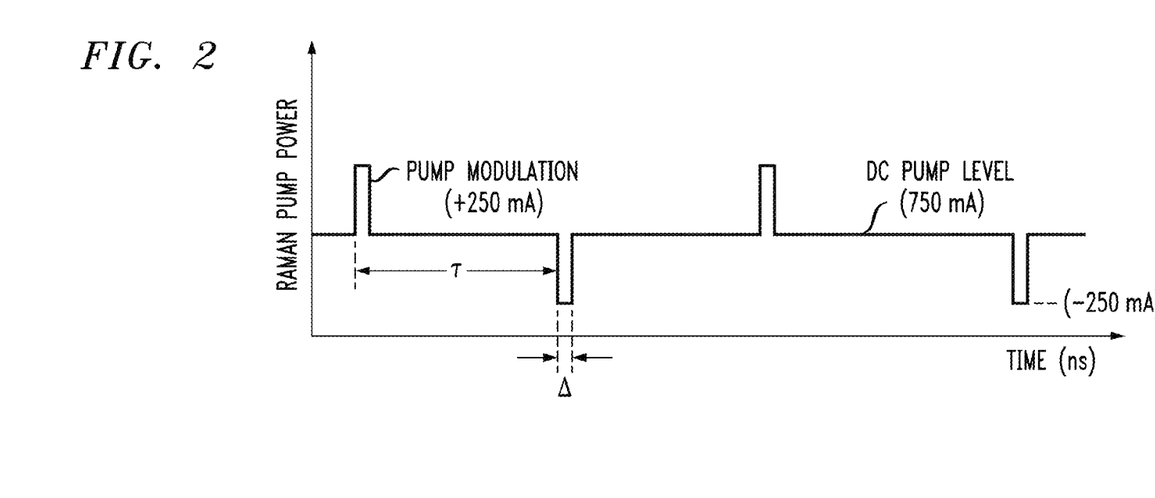
FIG. 2 contains a plot of OTSR pulses useful in the system of FIG. 1.

FIG. 2 contains a plot of OTDR pulses as they may be created using pulse generator 24. As shown, the pulses are selected to either "above" or "below" the DC level associated with conventional Raman pump operation. For the purposes of the present invention, pulses having a duration A on the order of tens to hundreds of nanoseconds have been found to be sufficient to capture enough information to perform OTDR measurements without affecting the amplifying function of the DRA.

In accordance with the principles of the present invention, pulse driver 24 is also configured to generate pulses at a predetermined repetition interval. For example, a predetermined repetition interval $\tau$ may be based on the round-trip transit time for a pulse through a fiber span of a given length. The selected repetition interval is considered to be a design consideration that may be determined on a case-by-case basis. The long delay $\tau$ between pulses is intended to limit the exposure of a propagating transmission signal to only a single pulse in any given fiber span. Indeed, the delay can be on the order of minutes (or longer), since the intent is to collect and analyze changes in the fiber as a function of its age. The higher frequency component attributable to the pulse is intended to limit the fluctuation in gain to only an inconsequential amount.

These pulses, while affecting the propagating optical signal at an inconsequential level, will still behave in the well-known manner that pulses are used in standard OTDR systems, creating reflected pulses that propagate back in the return direction along fiber span 10 (in this case, the reflected pulse travels in the same direction as optical input signal S). When reaching WDM 22, the reflected OTDR pulses are re-directed into circulator 20 and thereafter enter a monitoring module 30 used for analyzing the reflected pulses and performing the OTDR measurement functions. It is to be understood that while various other configurations may be used in place of circulator 20 (such as, for example, an optical tap), the low coupling loss property of a circulator is advantageous in this system, since the OTDR reflected pulses are already at a relatively low level and further loss (as may occur when using an optical tap) would impact the accuracy of the OTDR measurements.

Referring to FIG. 1, monitoring module 30 is shown as including a photodetector 32 that is used to capture the reflected OTDR pulses and convert the optical signal into an electrical equivalent. Inasmuch as short duration pulses are used to perform the OTDR measurement, it is important that the selected photodetector be capable of operating in a manner that can captured the minimal perturbations in the reflected signals attributed to the OTDR pulses (e.g. an avalanche photodiode (APD) or PiN photodiode). The electrical output from photodetector 32 is thereafter applied as an input to a transimpedance amplifier (TZA) 34, which is used to electrically amplify the detected signal to a level suitable for further processing. An A/D converter 36 is used to digitize the analog output from TZA 34 and, finally, a signal processor 38 is used for analyzing the received OTDR information.

As shown in FIG. 1, an optical filter 40 may be included in the signal path between circulator 20 and monitor module 30. Since a multiple number of individual pumps may be present on the reflected signal path, optical filter 40 is used to limit the specific wavelength(s) that are thereafter analyzed by module 30 to only the pump wavelengths) that have been modified to introduce OTDR pulses into the system.

In one exemplary embodiment of the present invention, pulse generator 24 may be used to inject OTDR pulses onto the output from only a single one of the Raman pumps. For example, it may be preferred to inject pulses on the longest wavelength pump (since this pump would not greatly interfere with any of the signals or Raman pumps propagating within the fiber), defined as Raman pump $14_N$ in this example. In this case, while Raman pump $14_N$ continues to illuminate optical fiber span 10 with a DC level light at its associated pump wavelength, pulses of a controlled, specific modulation depth, duration and repetition interval are introduced along pump path 18 and will ultimately be coupled into optical fiber span 10. These pulses are used to provide the desired OTDR measurements, in the manner described above, with the various reflections from the pulses returning along fiber 10, re-directed through WDM 22 and circulator 20 (and perhaps through optical filter 40) into module 30, where the actual OTDR measurement values are generated.

It is contemplated that in another embodiment of the present invention multiple Raman pumps may be pulsed to perform OTDR measurements. The various pump sources, which will be operating at different wavelengths, may also be pulsed at different intervals, or create pulses of different duration, modulation depth, or the like. The use of multiple pumps to generate OTDR pulses is considered useful when desiring to collect a larger amount of OTDR measurement data for analysis purposes.

Additionally, FIG. 1 is seen to include a pulse controller 50 that may be used in accordance with certain embodiments of the present invention to control the operation of pulse generator 24. For example, controller 50 may be used to select the specific Raman pump, or set of pumps, to be used for a specific OTDR measurement process. Controller 50 may also be used to control the various pulse parameters mentioned above; that is, pulse width, repetition interval, modulation depth, and the like. The polarity of the pulses may also be dictated by the operation of pulse controller 50 (for example, using only positive-going pulses, using only negative-going pulses, alternating positive and negative, etc.).

Moreover, it is contemplated that the results of a specific OTDR measurement evaluation as performed by signal processor 38 may be used to control the operation of pulse controller 50. For example, if a given fiber span has begun to exhibit accelerated ageing problems (as indicated by the measurement results from processor 38), controller 50 may be instructed to shorten the repetition interval of the pulses, try different pump wavelengths, increase the number of pumps used to create pulses, etc. Conversely, if OTDR measurements are found to be consistent over a relatively long time span, processor 38 may instruct controller 50 to perform fewer OTDR measurements during a given time span (i.e., extend the length of the repetition interval).

Figure 3:
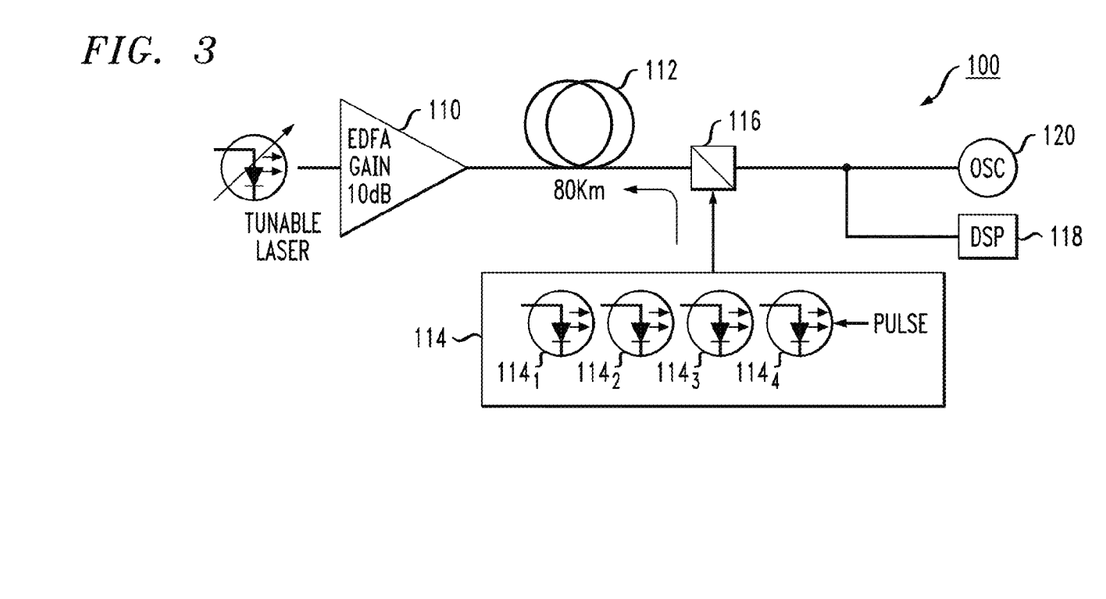
FIG. 3 illustrates an experimental network configuration designed to test the impact of OTDR pulses on the Raman amplification process.

FIG. 3 illustrates an experimental network configuration 100 that was designed to test the impact of OTDR pulses on the Raman gain created for a propagating information signal; that is, to efficacy of performing in-service OTDR measurements. As shown, configuration 100 includes an erbium-doped fiber amplifier (EDFA) 110, coupled to a section of optical fiber 112, with a "quad" DRA component 114 (i.e., a DRA system including a set of four separate Raman pump sources) coupled through a WDM 116 to the opposite termination of fiber 112. DRA component 114 was configured for this purpose to deliver a net Raman gain of 12dB to fiber 112, as shown in plot of FIG. 4 (which illustrates the various signals as would be viewed by a monitor 120). Pump source $114_4$, which provides the longest wavelength pump, was then pulsed at a modulation depth of 250 mA above its steady-state operating current of 750 mA for a pulse duration of 1 µs (also shown in FIG. 4). A pulse repetition rate of 1 msec was used to collect OTDR traces through a digital signal processor (DSP) 118 included in network configuration 100. A test signal of 1546.12 nm was launched from a tunable laser source 120 and passed through EDFA 110 and optical fiber 112, the test signal probing Raman gain modulation for analysis.

Figure 4:
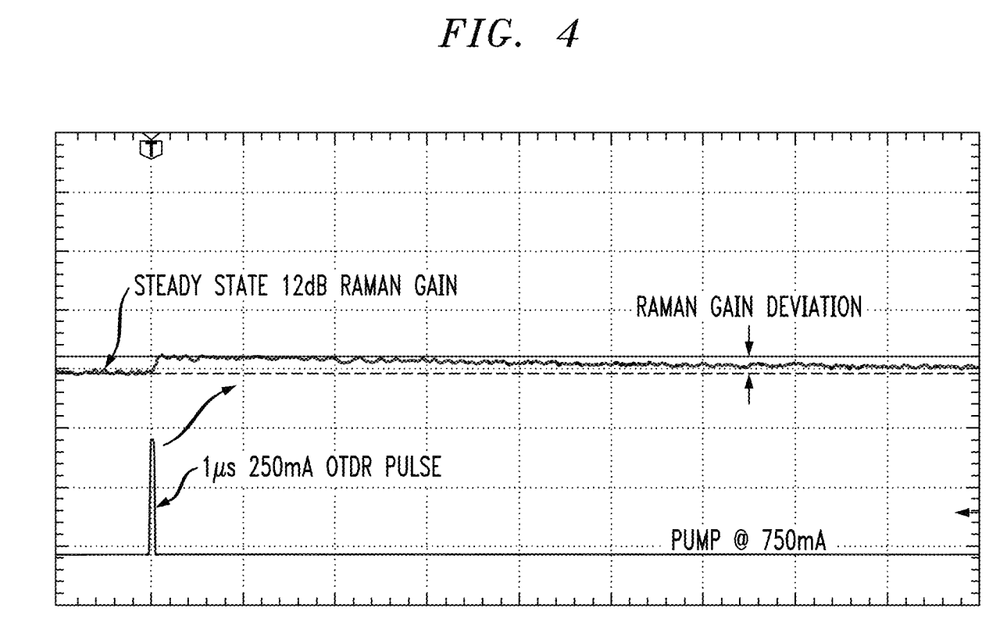
FIG. 4 contains plots of Raman gain and OTDR pulses associated with the configuration of FIG. 3.

Measurements as shown in FIG. 4 indicate a change in Raman gain of only about 0.007 dB (as compared to the steady-state Raman gain of 12dB) after the application of an OTDR pulse from Raman pump $114_4$.

Figure 5:
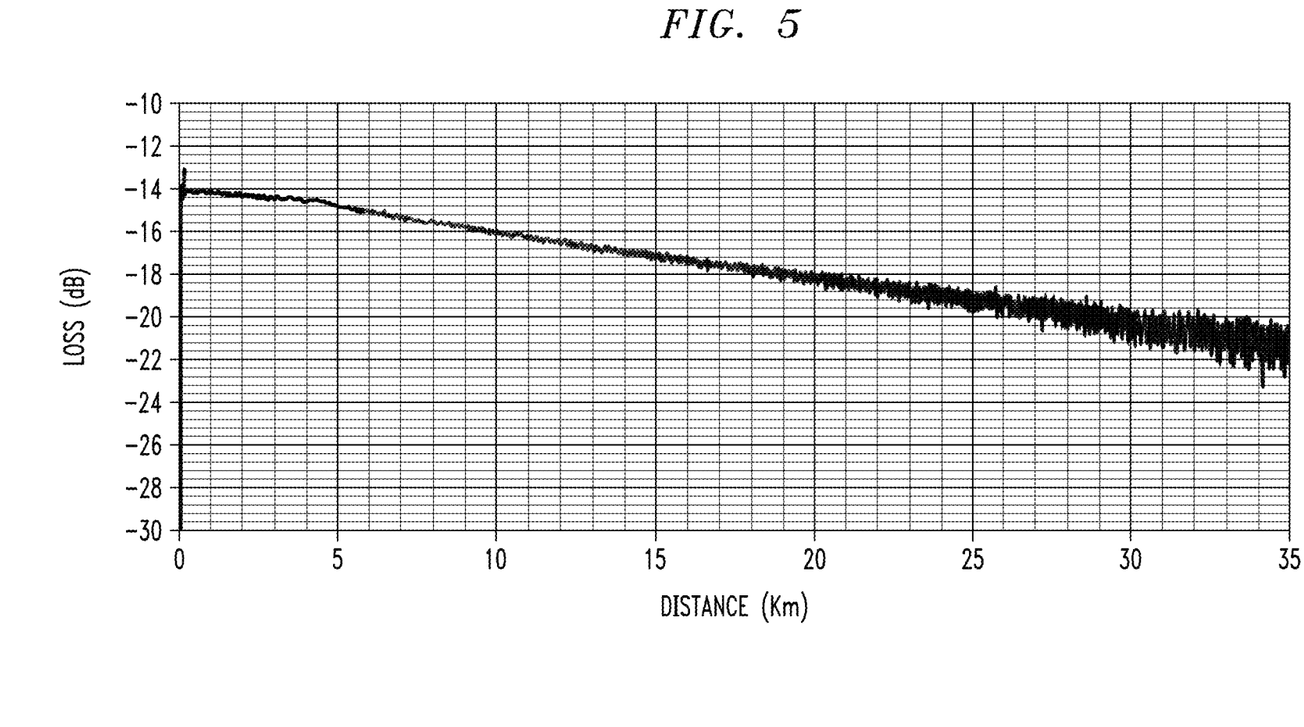
FIG. 5 is a graph of the reflected OTDR light associated with the arrangement of FIG. 3.
Figure 6:
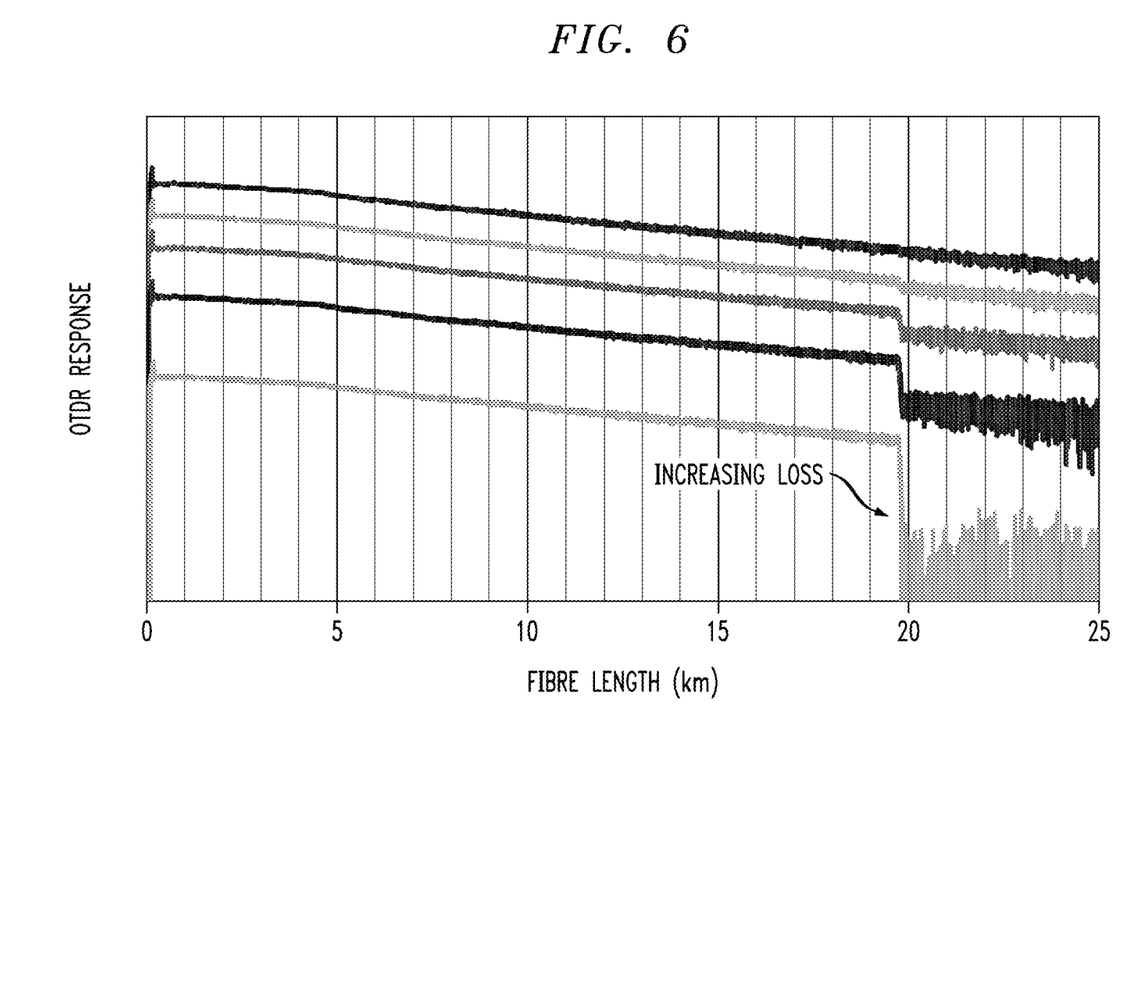
FIG. 6 contains several plots of OTDR response as a function of fiber length.

The corresponding OTDR trace, plotted in FIG. 5 clearly indicates the feasibility of providing this in-service OTDR functionality in accordance with the present invention. FIG. 6 illustrates how the loss is captured, with a clear event appearing in the measured data (it is to be noted that the data is plotted along the y-axis in a manner where the separate readings do not overlap).

Increased intelligence is being included within optical line components to allow for improved performance as data capacity is being increased. As described above, the technique of the present invention allows for in-service fiber span monitoring with minimal additional components with little impact on the Raman gain performance. Using a Raman pump that is already providing Raman gain has been shown to introduce only a relatively small deviation (on the order of 0.007 dB) to the operating gain. It is contemplated that with various engineering modifications to the configuration, this deviation may be reduced even further. Significantly, the technique of the present invention can be used to identify ageing loss during "live" transmission, providing the ability to flag and locate damage points in the fiber span that could eventually lead to system failure.

What is claimed is:

1. An arrangement for performing optical time reflectometry (OTDR) within a communication system utilizing distributed Raman amplification, the arrangement comprising
   a Raman pump source for supplying continuous power pump light to generate optical gain in a propagating signal
   a pulse generator coupled to the Raman pump source, the pulse generator for injecting pulses of a predetermined polarity, duration, modulation depth and repetition interval onto the continuous power pump light such that the injected pulses co-propagate with the continuous power pump light along a span of optical waveguide to be measured while generating optical gain, the injected pulses propagating along the optical waveguide and creating a plurality of reflected pulses as a function of conditions along the optical waveguide; and
   a monitoring module responsive to the plurality of reflected optical pulses, the monitoring module including a photodetector for converting the reflected optical signals into an electrical reflection signal and a signal processing component for determining OTDR measurements from the electrical reflection signal.

2. The arrangement of claim 1 wherein the pulse generator is coupled to a single Raman pump laser diode in the Raman pump source.

3. The arrangement as defined in claim 2 wherein the pulse generator is coupled to the single Raman pump laser diode operating at a longest wavelength within the Raman pump source.

4. The arrangement of claim 1 wherein the pulse generator is coupled to a plurality of separate Raman pump laser diodes within the Raman pump source.

5. The arrangement as defined in claim 4 wherein the pulse generator utilizes a separate set of polarity, duration, modulation depth and repetition interval parameters for each Raman pump laser diode in the plurality of separate Raman pump laser diodes.

6. The arrangement as defined in claim 4 wherein the pulse generator creates pulses upon more than Raman pump laser diode at the same time.

7. The arrangement as defined in claim 4 wherein the pulse generator creates pulses upon separate Raman pump laser diodes at different times.

8. The arrangement of claim 1 further comprising an optical filter disposed at the input of the monitoring module, the optical filter configured to pass only reflected optical pulses at the wavelengths of the one or more pulsed Raman laser diode sources.

9. The arrangement of claim 1 further comprising a pulse controller coupled to the pulse generator, the pulse controller providing command inputs to adjust one or more of the polarity, duration, modulation depth and repetition interval of the generated pulses.

10. The arrangement of claim 9 wherein the output from the monitoring module signal processing component is applied as an input to the pulse control and utilized to determine one or more of the generated command inputs.

11. The arrangement of claim 1 wherein the monitoring module comprises
- a transimpedance amplifier coupled to the output of the photodetector and providing an amplified electrical output signal;
- an A/D converter responsive to the amplified electrical output signal for creating a digital version thereof; and
- a signal processor responsive to the digital output of the A/D converter for performing processing of the digital data and creating OTDR measurements therefrom.

12. The arrangement of claim 1 wherein the optical waveguide is a section of optical fiber.

13. A distributed Raman amplifier system including in-service optical time domain reflectometry (OTDR) measurement capabilities, the distributed Raman amplifier system comprising:
- a transmission fiber for supporting the propagation of an optical signal;
- a Raman pump source coupled to the transmission fiber for injecting continuous power pump light into the transmission fiber and generating optical gain within the propagating optical input signal;
- a pulse generator coupled to the Raman pump source, the pulse generator injecting pulses of a predetermined polarity, duration, modulation depth and repetition interval upon the supplied pump light such that the pulses propagate with the continuous power pump light along the transmission fiber, the injected pulses propagating along the optical waveguide and creating a plurality of reflected pulses as a function of conditions along the transmission fiber; and
- a monitoring module responsive to the plurality of reflected pulses, the monitoring module including a photodetector for converting the reflected optical signals into an electrical reflection signal and a signal processing component for determining OTDR measurements from the electrical reflection signal.

14. The distributed Raman amplifier system as defined in claim 13 wherein the Raman pump source is disposed to provide counter-propagating pump light with respect to the propagation direction of the optical input signal.

15. The distributed Raman amplifier system as defined in claim 13 wherein the Raman pump source is coupled to the transmission fiber through a wavelength division multiplexer, wherein the wavelength division multiplexer also functions to direct the returning reflected pulses out of an amplified optical signal output path and toward the monitoring module.

16. The distributed Raman amplifier system as defined in claim 15 wherein the system further comprises an optical coupling component for redirecting the reflected pulses from the wavelength division multiplexer into the monitoring module, output of a signal path associated with the Raman pump source.

17. The distributed Raman amplifier system as defined in claim 16 wherein the optical coupling component comprises an optical circulator.

18. The distributed Raman amplifier system as defined in claim 15 wherein the system further comprises an optical filter disposed between the optical coupling component and the monitoring module, the optical filter configured to pass only reflected optical pulses at the wavelengths of the one or more pulsed Raman laser diode sources.

19. The distributed Raman amplifier system of claim 15 further comprising a pulse controller coupled to the pulse generator, the pulse controller providing command inputs to adjust one or more of the polarity, duration, modulation depth and repetition interval of the generated pulses.

20. The distributed Raman amplifier system of claim 19 wherein the output from the monitoring module signal processing component is applied as an input to the pulse control and utilized to determine one or more of the generated command inputs.

* * * * *